United States Patent
Tsuji et al.

(10) Patent No.: US 7,494,609 B2
(45) Date of Patent: Feb. 24, 2009

(54) CLAMPING SYSTEM AND CLAMPING METHOD

(75) Inventors: Makoto Tsuji, Kanagawa (JP); Saburo Noda, Kanagawa (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 167 days.

(21) Appl. No.: 11/466,930

(22) Filed: Aug. 24, 2006

(65) Prior Publication Data

US 2007/0048398 A1    Mar. 1, 2007

(30) Foreign Application Priority Data

Aug. 25, 2005 (JP) ............................ P2005-244309

(51) Int. Cl.
B29C 45/64 (2006.01)
B22D 17/26 (2006.01)

(52) U.S. Cl. .................... 264/40.5; 164/4.1; 164/137; 164/154.2; 164/341; 425/150; 425/589; 425/595

(58) Field of Classification Search ................ 264/40.1, 264/40.5; 425/150, 589, 595, 450.1, 451.9; 164/4.1, 137, 151.2, 154.2, 341, 343
See application file for complete search history.

(56) References Cited

U.S. PATENT DOCUMENTS

| | | | | |
|---|---|---|---|---|
| 3,940,930 A | * | 3/1976 | Rosander | ................ 60/375 |
| 6,821,104 B2 | * | 11/2004 | Kubota et al. | ............. 425/150 |
| 7,001,545 B2 | * | 2/2006 | Okado et al. | ............. 264/40.5 |
| 7,287,972 B2 | * | 10/2007 | Tsuji et al. | ............. 425/149 |
| 7,288,221 B2 | * | 10/2007 | Tsuji et al. | ............. 264/40.5 |

FOREIGN PATENT DOCUMENTS

| JP | 2-290662 | 11/1990 |
|---|---|---|
| JP | 2004-001470 | 1/2004 |
| JP | 2004-322609 | 11/2004 |

OTHER PUBLICATIONS

Office Action issued in foreign counterpart Chinese Application No. 200610132287.9, date stamped Nov. 23, 2007.
Partial English translation of Office Action issued in foreign counterpart Chinese Application No. 200610132287.9, date stamped Nov. 23, 2007.

* cited by examiner

Primary Examiner—James Mackey
(74) Attorney, Agent, or Firm—DLA Piper LLP (US)

(57) ABSTRACT

A clamping system provided with a fixed die plate, a movable die plate, a plurality of tie bars, half nuts able to be coupled with or release coupled parts of a plurality of tie bars, clamping cylinders accommodating pistons of a plurality of tie bars, position sensors detecting positions of pistons, a plurality of direction control valves connected to a plurality of clamping cylinders, and a control unit controlling the plurality of direction control valves so that a difference of movement amounts of pistons among the plurality of tie bars from the time of die contact to the time of the completion of clamping becomes within a predetermined permissible value based on detection results of the position sensors.

2 Claims, 6 Drawing Sheets

CLAMPING SYSTEM AND CLAMPING METHOD

BACKGROUND OF THE INVENTION

1. Field of the Invention

The present invention relates to a clamping system and a clamping method.

2. Description of the Related Art

In a clamping system, where the degree of parallelism between a movable die plate and a fixed die plate cannot be held, the dimensional error of the product becomes larger, burrs easily occur, and other problems arise. Therefore various techniques for keeping the degree of parallelism between a movable die plate and a fixed die plate have been proposed. For example, Japanese Patent Publication (A) No. 2004-322609 discloses a technique of providing a plurality of ball screws for moving the movable die plate in a die opening and closing direction on the peripheries of the movable die plate and the fixed die plate along the tie bars and individually controlling the drive operations of these plurality of ball screws so as to perform the clamping while maintaining the degree of parallelism between the die plates. Note that, although not concerning the degree of parallelism of die plates, a technique of detecting a location of a piston for clamping provided on the tie bar is known (for example, Japanese Patent Publication (A) No. 2004-001470).

In the technique of Japanese Patent Publication (A) No. 2004-322609, the degree of parallelism between die plates is adjusted from the start of clamping to the die contact. In the clamping system, however, sometimes the degree of parallelism between die plates is degraded even during the period after the die contact to the completion of clamping.

SUMMARY OF THE INVENTION

An object of the present invention is to provide a clamping system and a clamping method able to suppress the degradation of the degree of parallelism during the period after die contact to the completion of clamping and able to maintain the degree of parallelism between die plates at the time of the completion of the clamping.

According to a first aspect of the present invention, there is provided a clamping system clamping a fixed die and a movable die, comprising a fixed die plate holding the fixed die; a movable die plate holding the movable die and moveable in a die opening and closing direction with respect to the fixed die plate; a plurality of tie bars each having a coupled part coupling with one of the fixed die plate and the movable die plate and a piston accommodated in the other of the fixed die plate and the movable die plate and generating a clamping force; a plurality of coupling parts each provided in the one of the fixed die plate and the movable die plate and able to couple with or release the coupled part of one of the plurality of tie bars; a plurality of clamping cylinders each provided in the other of the fixed die plate and the movable die plate and having a cylinder chamber accommodating a piston of one of the plurality of tie bars and at least two working fluid feed ports feeding a working fluid generating the clamping force to the cylinder chamber; detectors detecting physical amounts enabling identification of movement amounts of the pistons of the plurality of tie bars; a plurality of directional control valves each connected to the working fluid feed ports and switching a destination of feed of the working fluid between a first cylinder chamber and a second cylinder chamber divided by the piston of one the plurality of clamping cylinders; and a control part controlling the plurality of directional control valves based on detection results of the detectors so that a difference of the movement amounts of the pistons among the plurality of tie bars from the time of die contact to the time of completion of the clamping becomes within a predetermined permissible value.

Preferably, the system is further including a die open and close use drive part moving the movable die plate in the die opening and closing direction with respect to the fixed die plate, wherein, the control part, during a die closing operation, controls the die open and close use drive part so as to switch the movement speed of the movable die plate to a low speed before die contact, controls the directional control valves so as to start the movements of the plurality of tie bars in the die closing direction simultaneously with or after the switching to the low speed, and controls the plurality of coupling parts so that the coupled parts of the plurality of tie bars and the plurality of coupling parts are coupled before die contact in a state where the movable die plate and the plurality of tie bars are moving.

Preferably, the control part, during the die closing operation, controls the movement speeds of the plurality of tie bars with reference to the movement speeds of the plurality of tie bars based on detection results of the detectors and controls the coupling parts so that the coupled parts of the plurality of tie bars and the coupling parts are coupled when the difference between the movement speed of the movable die plate and the movement speeds of the plurality of tie bars is within a predetermined permissible value.

Preferably, the coupled parts are formed on outer circumferential surfaces of the plurality of tie bars and include a plurality of grooves arranged along an axial direction of the plurality of tie bars, the coupling parts include projection parts, the coupled parts and the coupling parts are coupled by engagement of the projection parts with any of the plurality of grooves, proximity switches fixed with respect to the movable die plate and outputting signals in accordance with changes of distances from the outer circumferential surfaces of the plurality of tie bars by the movement of the plurality of tie bars in the axial direction are provided, and the control part detects positions of the plurality of grooves with respect to the coupling parts based on the signals from the proximity switches and controls the coupling parts so as; to engage the projection parts with any of the plurality of grooves.

According to a second aspect: of the present invention, there is provided a clamping method of a molding machine having a clamping mechanism having a fixed die plate holding a fixed die, a movable die plate holding a movable die and moveable in a die opening and closing direction with respect to the fixed die plate, a plurality of tie bars each having a coupled part and piston, a plurality of coupling parts each provided in one of the fixed die plate and the movable die plate and able to couple with or release a coupled part of one of the plurality of tie bars, and a plurality of clamping cylinders each provided in the other of the fixed die plate and the movable die plate and having a cylinder chamber accommodating a piston of one of the plurality of tie bars and at least two working fluid feed ports feeding the working fluid generating the clamping force to the cylinder chamber, comprising the steps of measuring movement amounts of the pistons of the plurality of tie bars from the time of die contact and adjusting the amounts of feed of the working fluid into the cylinder chambers so that the difference of the measured movement amounts among the plurality of tie bars becomes within a predetermined permissible value at the time of the completion of the clamping.

According to the present invention, therefore, the degradation of the degree of parallelism during the period from die contact to the completion of clamping is suppressed, and the degree of parallelism between die plates can be maintained at the time of the completion of clamping.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

Figure 1:
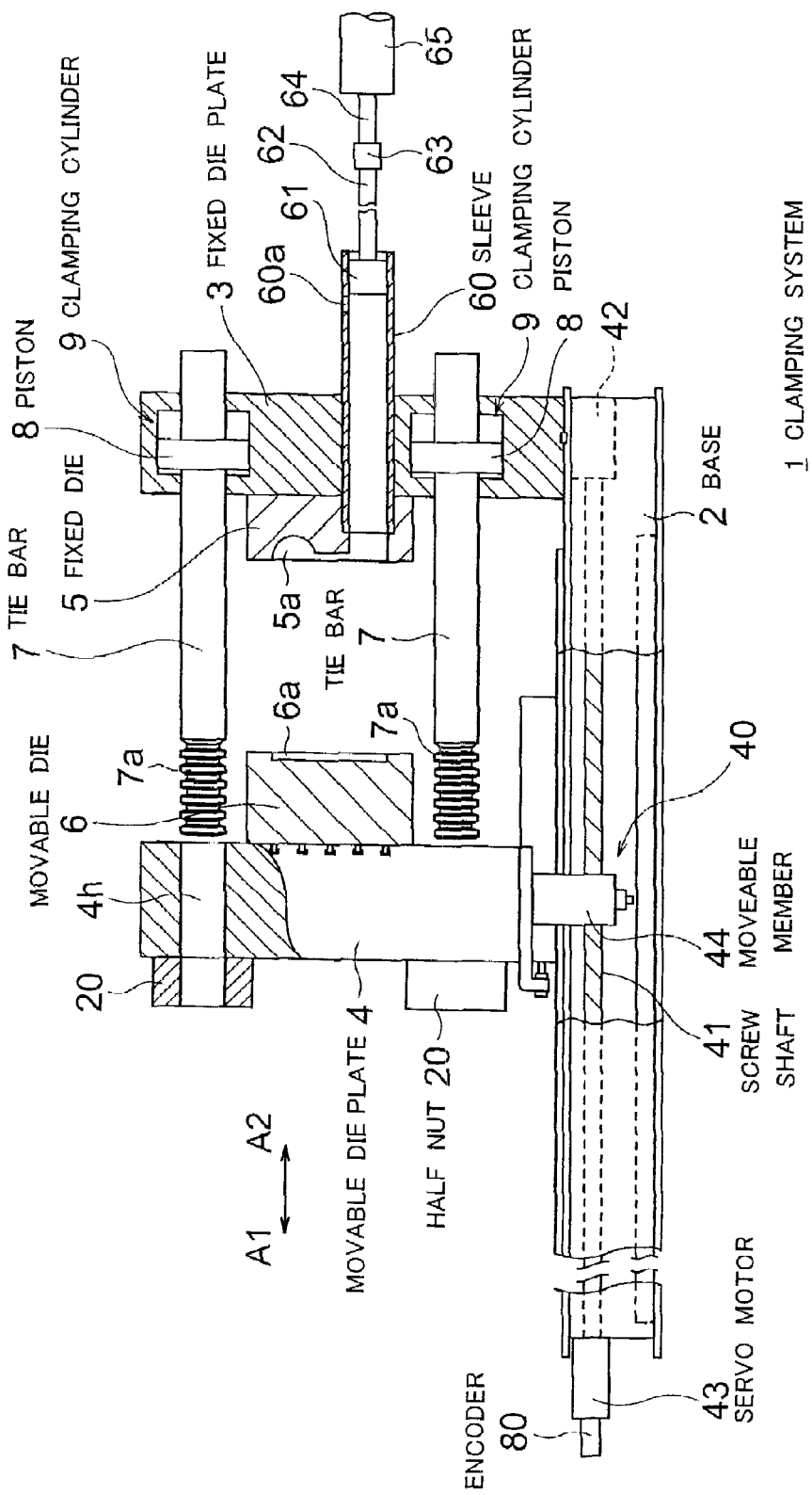
FIG. 1 is a front view including a sectional view of a part showing the configuration of a machine part of a clamping system according to an embodiment of the present invention.
Figure 2:
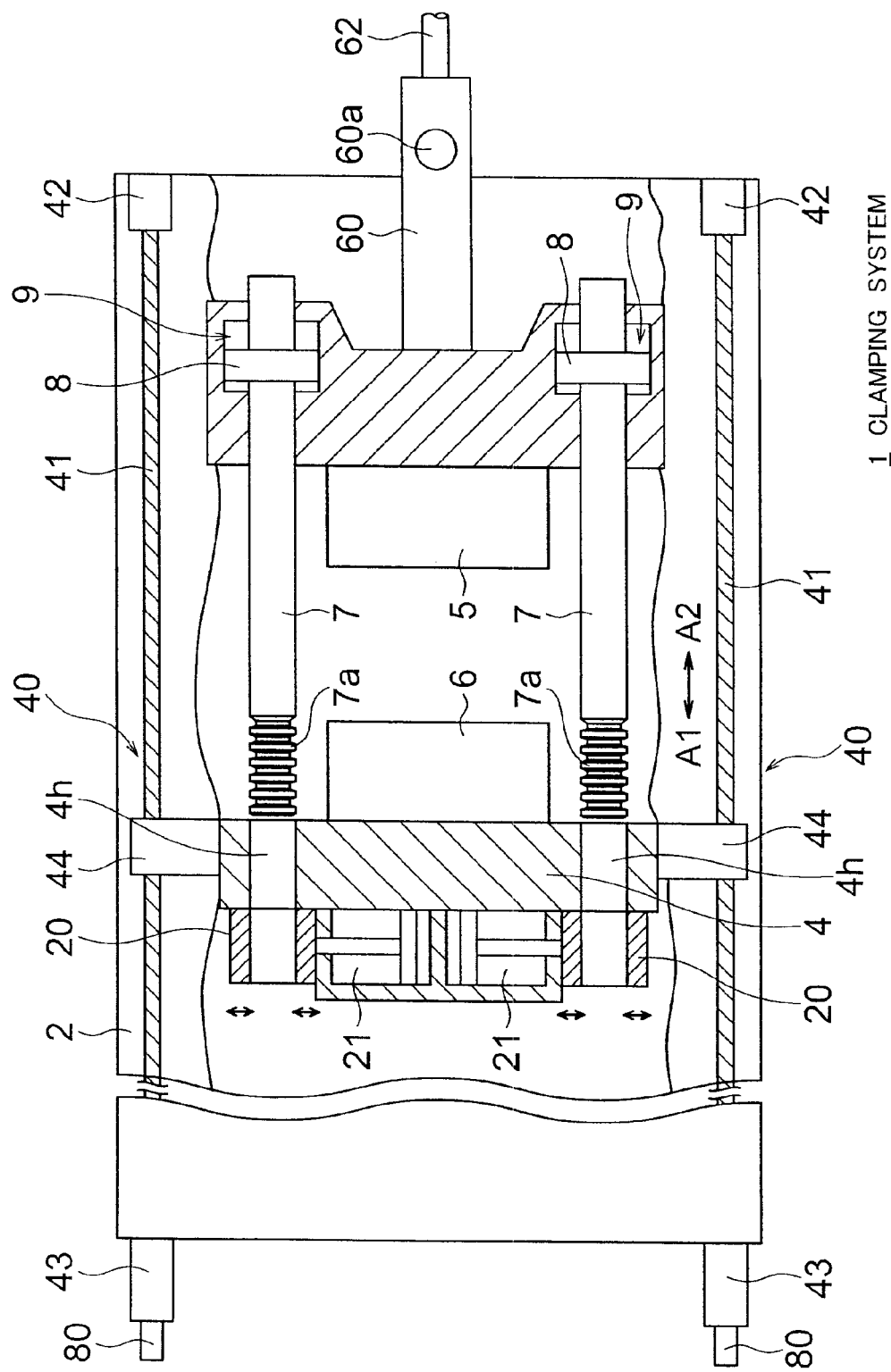
FIG. 2 is a view of the clamping system of FIG. 1 as seen from above.
Figure 3:
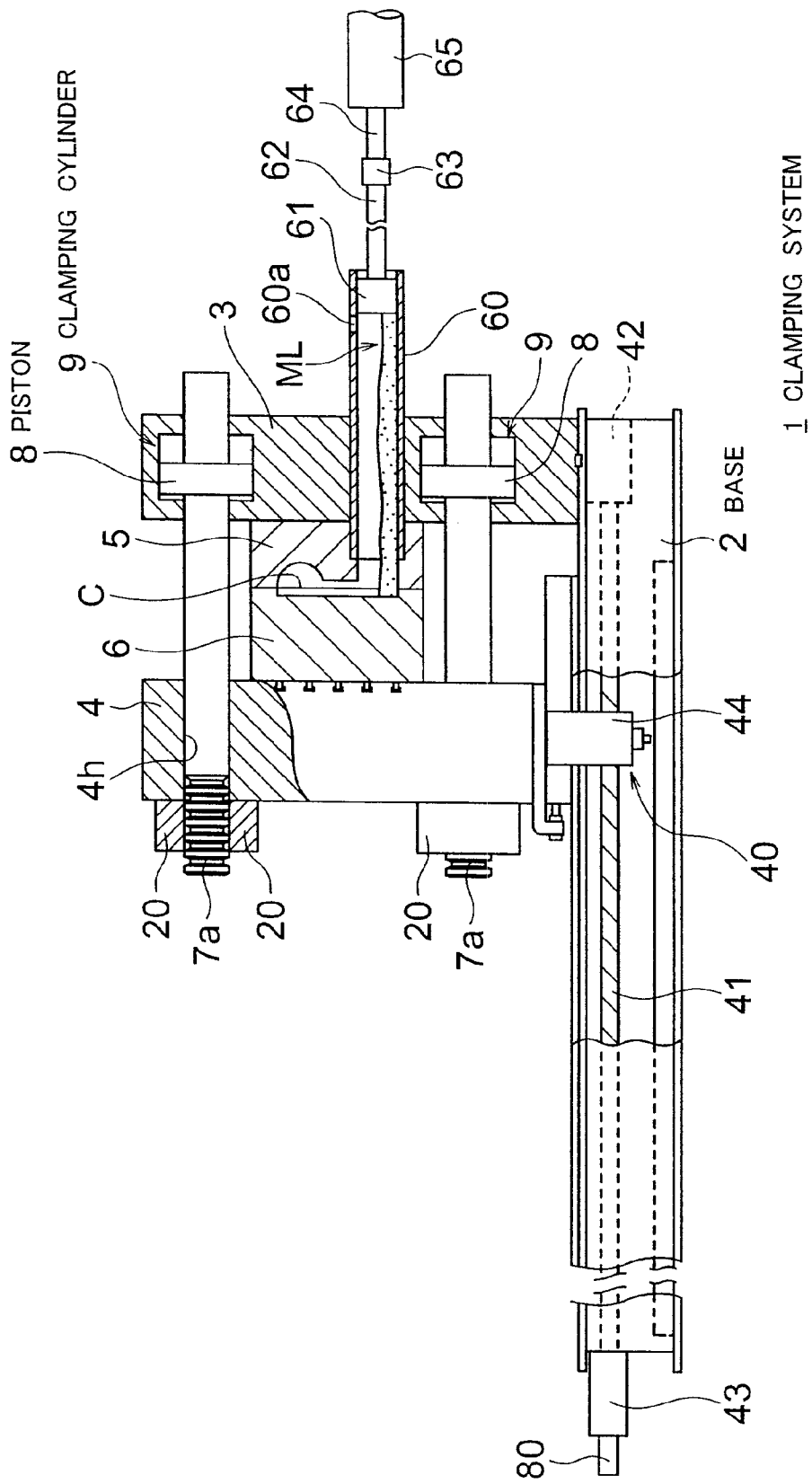
FIG. 3 is a view showing a state at the time of completion of clamping of the clamping system of FIG. 1.

FIG. 1 is a front view including a sectional view of a part showing the configuration of a machine part of a clamping system 1 according to an embodiment of the present invention and shows a state before the adjustment of the die thickness. Further, FIG. 2 is a view of the clamping system 1 of FIG. 1 as seen from above. FIG. 3 is a front view including a sectional view of a part showing the configuration of the machine part of the clamping system 1 and shows a state where molten metal ML is injected after the completion of clamping. Note that, the clamping system according to the present embodiment is applied to a die cast machine. The clamping system 1 is constituted as a so-called composite type clamping system having a movement mechanism 40 mainly utilized for opening and closing the dies and clamping cylinders 9 mainly utilized for the clamping. Further, the clamping system 1 has a fixed die plate 3, a movable die plate 4, tie bars 7, and half nuts 20. Note that the half nuts 20 are embodiments of the coupling means of the present invention.

The fixed die plate 3 is fixed on a base 2. This fixed die plate 3 holds a fixed die 5 on its front surface. The movable die plate 4 holds a movable die 6 on its front surface (side facing the fixed die plate 3). The movable die plate 4 is provided on the base 2 so that it can move in a die opening direction A1 and a die closing direction A2. Specifically, by a sliding plate 11 fixed on the base 2 and a sliding plate 12 fixed beneath the movable die plate 4 and slidable with respect to the sliding plate 11, a slider is formed. Due to this, the movable die plate 4 is moveably supported with respect to the base 2. Further, the movable die plate 4 is formed with through holes 4h into which the tie bars 7 are inserted. These through holes 4h are formed at for example the four corners of the movable die plate 4. By the clamping of the pair of dies comprised of the fixed die 5 and the movable die 6, a cavity is formed between a concave part 5a of the fixed die 5 and a concave part 6a of the movable die 6.

A sleeve 60 is provided on the back surface of the fixed die plate 3. A plunger tip 61 fits into the sleeve 60. A plunger rod 62 having a tip end to which the plunger tip 61 is connected is connected with a piston rod 64 of an injection cylinder 65 via a coupling 63. The injection cylinder 65 is driven by hydraulic pressure and moves the piston rod 64 back and forth. By moving the piston rod 64 forward in the state where the molten metal ML is fed into the sleeve 60 through a feed port 60a, the molten metal ML is injected and filled into the cavity C formed between the clamped fixed die 5 and the movable die 6 as a shaped material. Note that the injection system is constituted by the parts 60 to 65. Further, the die cast machine is constituted by the clamping system 1 and the injection system.

Each tie bar 7 is horizontally supported by the fixed die plate 3. A free end of the tie bar 7 on the movable die plate 4 side is formed with a coupled part 7a. The coupled part 7a is for example comprised of a plurality of grooves, extending in a circumferential direction on the outer circumference of the tie bar 7, arranged in the axial direction of the tie bar 7. Note that the grooves may be formed spirally as well. In the middle of the tie bar 7, a piston 8 to be held in the clamping cylinder 9 is provided.

Each clamping cylinder 9 is formed inside the fixed die plate 3. A piston 8 is moveably held in this fixed die plate 3. By feeding working oil having a high pressure into the cylinder chambers of the clamping cylinders 9, a force acts between the fixed die plate 3 and the tie bar 7, whereby the tie bar 7 is driven with respect to the fixed die plate 3. Within the moveable range of a piston 8 connected with a tie bar 7, that is, the range of stroke of the clamping cylinder 9, a tie bar 7 can move with respect to the fixed die plate 3.

The movement mechanism 40 is built in the base 2 and has screw shafts 41, support members 42, servo motors 43, and a moveable member 44. Each support member 42 is fixed with respect to the base 2 and supports one end of a screw shaft 41 so that it can freely rotate. The other end of the screw shaft 41 is connected with the servo motor 43 fixed to the base 2. The screw shaft 41 is screwed into the moveable member 44. The moveable member 44 is fixed to the two sides of the movable die plate 4 as shown in FIG. 2.

In this movement mechanism 40, by controlling the rotation of the servo motors 43, the screw shafts 41 rotate. The rotation of the screw shafts 41 is converted to linear movement of the moveable members 44. Due to this, the movable die plate 4 is driven to the die opening direction A1 or the die closing direction A2. The location of the movable die plate 4 is identified by detecting the locations of the moveable members 44 by encoders 80 of the servo motors 43.

Each half nut 20 is arranged behind a through hole 4h of the movable die plate 4. This half nut 20 has projected rims (see FIG. 4) engaged with the coupled part 7a of the tie bar 7. In other words, the coupled part 7a and the half nut 20 are formed as sawtooth shape and mesh with each other. The half nut 20 is opened and closed by a half nut open and close cylinder 21. When the half nut 20 is closed and engages (is coupled) with the coupled part 7a of the tie bar 7, the tie bar 7 and the movable die plate 4 are connected. When the half nut 20 opens, the connection between the tie bar 7 and the movable die plate 4 is released.

Figure 4:
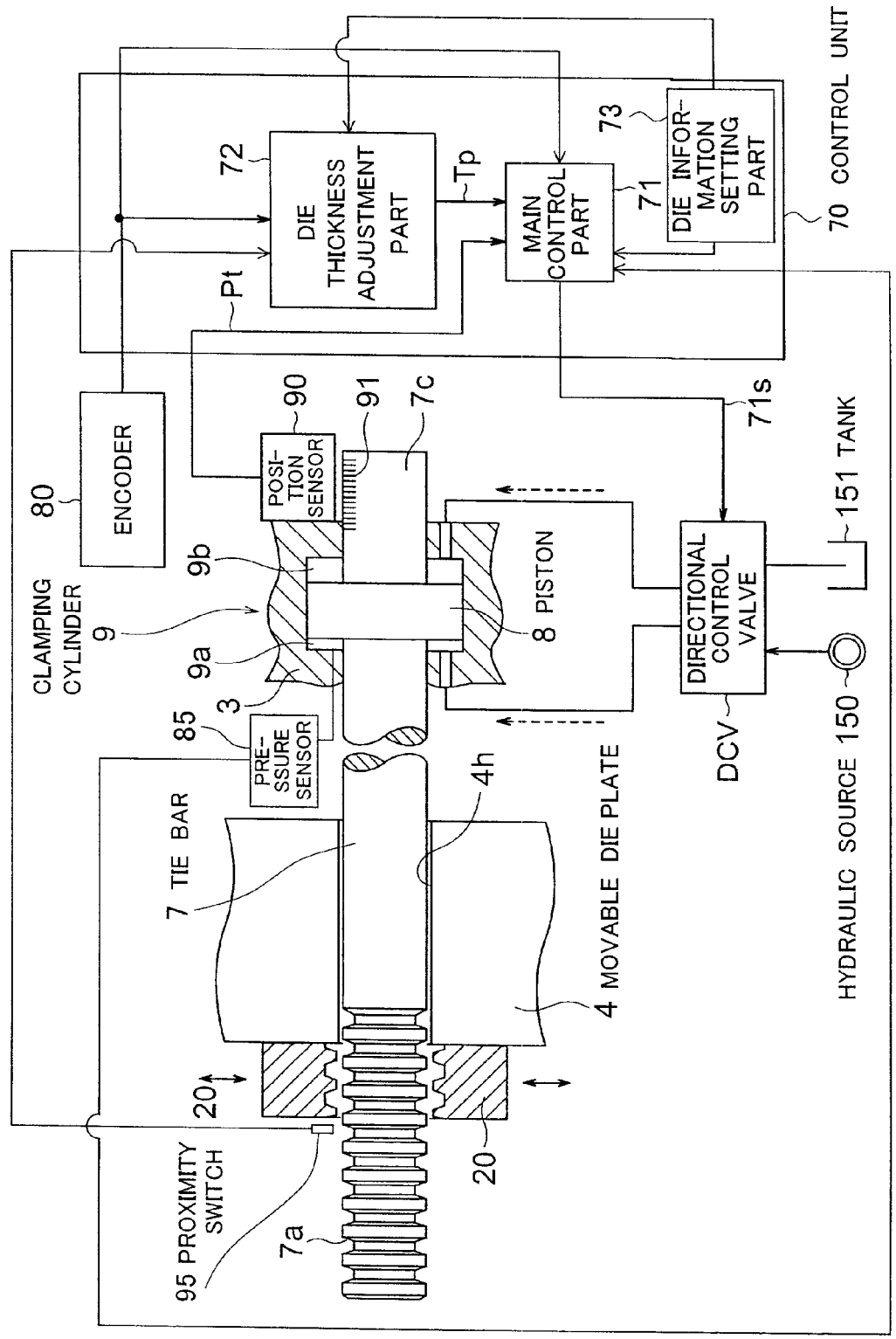
FIG. 4 is a view showing a signal processing system of the clamping system of FIG. 1.

FIG. 4 shows the structures at the periphery of a clamping cylinder 9, the half nut 20 and the coupled part 7a of the tie bar 7 and the configuration of the control unit 70 of the clamping system 1. FIG. 4 shows one tie bar 7, but the explanation is the same for the other tie bars 7 as well.

As shown in FIG. 4, the cylinder chambers 9a and 9b divided by the piston 8 of the clamping cylinder 9 are formed with feeding ports for feeding the working oil. The feeding ports are connected to a direction control valve DCV through conduits. The direction control valve DCV feeds working oil having a high pressure fed from a hydraulic source 150 to one of the cylinder chambers 9a and 9b of the clamping cylinder 9 in response to a control instruction 71s from the control unit 70. Note that the direction control valve DCV directs the working oil from the hydraulic source 150 to a tank 151 when the piston 8 is not driven. The hydraulic source 150 feeds working oil boosted to a pressure required for the clamping to the direction control valve DCV. The pressures of the cylinder chambers 9a and 9b are detected by a pressure sensor 85.

As shown in FIG. 4, a scale 91 is formed at rear end 7c of the tie bar 7. A position sensor 90 is provided at a location facing the scale 91. The position sensor 90 detects a position Pt of the tie bar 7 and outputs the same to the control unit 70. As the position sensor 90, use can be made of for example one optically or magnetically detecting the position. The position sensor 90 may be an absolute position sensor or an incremental position sensor.

A proximity switch (proximity sensor) 95 is provided on the back surface side of the half nut 20. The proximity switch 95 is a sensor outputting a signal in accordance with a change of the distance from an object. For example, the proximity switch outputs an ON signal when the object approaches it by a predetermined range. The proximity switch 95 can be constituted by an opto-electric sensor, laser sensor, magnetic sensor, ultrasonic sensor, or other suitable type of sensor. The proximity switch 95 is fixed with respect to the movable die plate 4 and, at the same time, provided so that the outer circumferential surface of the tie bar 7 is in the detection direction. Accordingly, by the movement of the tie bar 7 in the axial direction, the distance between the detection surface of the proximity switch 95 and the outer circumferential surface of the tie bar 7 changes by the depth of a groove of the coupled part 7a. For example, the proximity switch 95 does not output a signal when it faces a groove of the coupled part 7a (when it is separated from the tie bar 7), and it outputs the ON signal when it faces the projected rim between grooves of the coupled part 7a (when it is in proximity with the tie bar 7).

The control unit 70 has a main control part 71, a die thickness adjustment part 72, and a die information setting part 73. Note that the functions of the control unit 70 are realized by hardware such as a processor and the required software.

The die information setting part 73 acquires and holds die information concerning the fixed die 5 and the movable die 6. The die information is acquired by a worker inputting the data to a not shown control panel or by the control unit 70 reading the data via a storage medium or network. The die information includes for example the die thickness.

The die thickness adjustment part 72 outputs the information required for the die thickness adjustment to the main control part 71 based on output signals of the encoders 80 and the proximity switches 95 and the die information held by the die information setting part 73.

The main control part 71 performs various processing for overall control of the clamping system 1. For example, at the time of the adjustment of the die thickness, it controls the direction control valves DCV based on signals from the die thickness adjustment part 72, encoders 80, position sensors 90, pressure sensors 85, etc. At the time of the clamping, it controls the direction control valves DCV based on signals from the die information setting part 73, the pressure sensors 85, etc.

Figure 5:
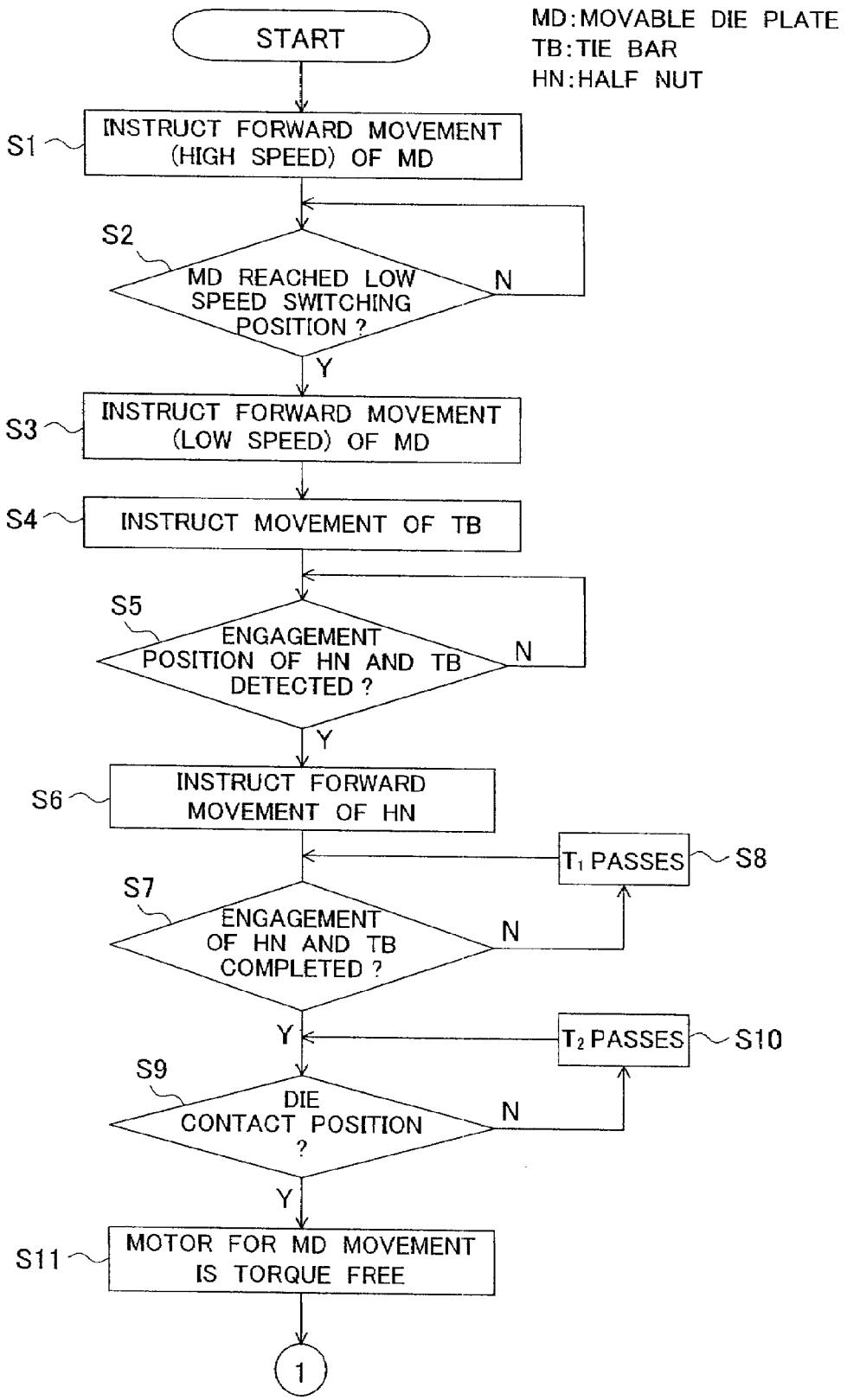
FIG. 5 is a flow chart showing the routine of processing executed by a control unit of the clamping system of FIG. 1.
Figure 6:
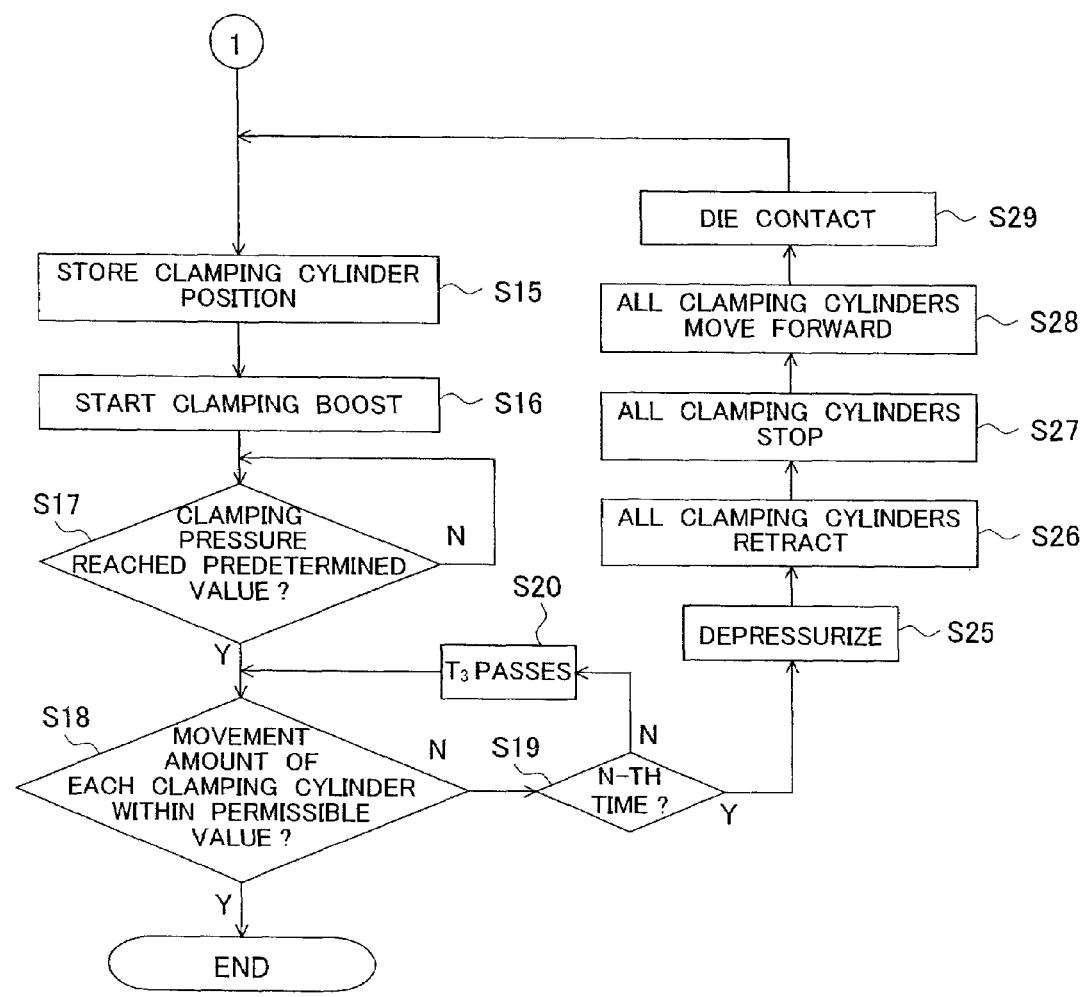
FIG. 6 is a flow chart continuing from FIG. 5.

FIG. 5 and FIG. 6 are flow charts showing the routine of the processing executed by the control unit 70 in the die thickness adjustment and clamping. The processing is carried out for each shot. When this processing is started, as shown in FIG. 1 and FIG. 2, the movable die plate 4 is located at: the predetermined die opening position, and the connections between the coupled parts 7a and the half nuts 20 are released.

At step S1, the control unit: 70 instructs the movement (forward movement) of the movable die plate 4 in the die closing direction A2 to the servo motors 43. This movement is carried out at a high speed from the viewpoint of shortening the cycle time.

At step S2, it is judged whether or not the movable die plate 4 reaches a low speed switch position for switching the movement of the movable die plate 4 from high speed to low speed based on the detection result of the encoders 80. Note that, by the worker previously inputting the low speed switch position to the control unit 70 or by the control unit 70 automatically setting the same based on the die information etc. held in the die information setting part 73, the low speed switch position is set at the position before the die contact.

When judging that the movable die plate 4 has not reached the low speed switch position, the control unit 70 continues the high speed movement of the movable die plate 4, while when judging that the movable die plate 4 has reached the low speed switch position, it instructs the servo motors 43 so as to switch the movement of the movable die plate 4 to the low speed (step S3).

At step S4, the control unit: 4 instructs the movements of the tie bars 7 to the die closing direction A2 to the direction control valves DCV. Note that, the movements of the tie bars 7 are started simultaneously with the switching of the movement of the movable die plate 4 from the high speed to the low speed or with a little time lag from that. Further, the movement speeds of the tie bars 7 are set at lower than the movement speed of the movable die plate 4.

The control unit 70 acquires the movement speeds of the tie bars 7 by differentiating the displacements detected by the position sensors 90 and controls the direction control valves DCV so that the movement speeds become the previously determined speeds. Then, when the speed difference between the tie bars 7 and the movable die plate 4 becomes within the predetermined permissible value, the routine proceeds to step S5. Note that the control unit 70 may control the direction control valves DCV so that the pressures detected by the pressure sensors 85 become a predetermined pressure without acquiring the speeds of the tie bars 7.

At step S5, it is judged whether or not the coupled parts 7a and the half nuts 20 are located at the coupling positions based on the signals from the proximity switches 95. Namely, for the coupling of the coupled parts 7a and the half nuts 20, as understood from FIG. 4, the coupled parts 7a and the half nuts 20 must be located at the coupling positions at which the grooves of the coupled part 7a and the projected rims of the half nuts 20 face each other. There is a speed difference between the tie bars 7 and the movable die plate 4, therefore the coupled parts 7a and the half nuts 20 will be located at the coupling positions at some time or another. Accordingly, if the locations of the proximity switches 95 are previously set with respect to the locations of the half nuts 20 so that the proximity switches 95 output the ON signals when the coupled parts 7a and the half nuts 20 are located at the coupling positions, the control unit 70 can judge whether or not the coupling positions have been reached according to presence of the ON signals from the proximity switches 95.

When the control unit 70 judges that the coupled parts 7a and the half nuts 20 at the coupling positions, it instructs the connections of the coupled parts 7a and the half nuts 20 (forward movement of the half nuts 20) to not shown control valves controlling the feed of the working oil to the half nut open and close cylinders 21 (step S6). Note that, even if there is slight error in the detection of the coupling positions, since there is a speed difference between the coupled parts 7a and the half nuts 20, the projected rims of the half nuts 20 slide with respect to the projected rims of the coupled parts, and the projected rims of the half nuts 20 engaged with the grooves of the coupled parts 7a. Further, the locations of the proximity switches 95 may be set so that the proximity switches 95 output the ON signal when the coupled parts 7a and the half nuts 20 are located away from the coupling positions by exactly predetermined distances, and the timings of the forward movements of the half nuts 20 may be determined by considering the speed difference between the movable die plate 4 and the tie bars 7.

At step S7, the control unit 70 judges whether or not the half nuts 20 and the coupled parts 7a have finished being coupled. For example, it judges this based on the detection results of not shown position sensors for detecting the positions of the pistons of the half nut open and close cylinders 21. When it judges that the coupling is not completed, the control unit 70 stands by for exactly a predetermined time T1 while continuing the forward movements of the half nuts 20 (step S8), then executes step S7 again. When judging that the coupling is completed, the control unit 70 proceeds to step S9.

At step S9, the control unit 70 judges whether or not the movable die plate 4 has reaches the die contact position. Specifically, it judges this by comparing the position of the movable die plate 4 detected by the encoders 80 and the die contact position. Note that, the die contact position is acquired by a worker previously inputting the die contact position to the control unit 70 via the not shown control panel or by the control unit 70 computing the same based on the information of die thickness etc. held in the die information setting part 73.

When the control unit 70 judges that the movable die plate 4 has not reach the die contact position, it stands by for a predetermined time T2 while continuing the forward movement of the movable die plate 4 (step S10), then executes step S9 again. When it judges that the movable die plate 4 has reached the die contact position, it sets the servo motors 43 which had been driving the movable die plate 4 to a torque free state (step S11).

At step S15, the control unit 70 stores the positions of the pistons 8 of the clamping cylinders 9. Namely, it stores the positions of the tie bars 7 detected by the position sensors 90 at present.

At step S16, the control unit 70 starts the clamping boost operation. Specifically, it controls the direction control valves DCV so as to feed the working oil to the cylinder chambers 9a.

At step S17, the control unit 70 judges whether or not the clamping force has reached a previously determined value based on the pressures detected by the pressure sensors 85. When judging that the clamping force has not reached the previously determined value, it stands by while continuing the boosting operation. When judging that the clamping force has reached the previously determined value, the control unit 70 proceeds to step S18.

At step S18, the control unit 70 compares the positions of the pistons 8 stored at step S15 and the positions of the pistons 8 detected by the position sensors 90 at present, identifies the amounts of movement of the pistons 8 from the time of the die contact, and judges whether or not the difference of the identified movement amounts among a plurality of pistons 8 is within the permissible value. Note that, the control unit 70 may judge whether or not the difference among the plurality of pistons 8 is within the permissible value directly by calculating the difference of the movement amounts among the plurality of pistons 8 and judging whether or not that difference is within the permissible value or indirectly by judging whether or not the difference between the movement amount of the pistons 8 and a previously determined movement amount is within the permissible value for each of the plurality of pistons 8 and regarding that the difference of the movement amounts among the plurality of pistons 8 is not within the permissible value when there is a piston 8 having a difference from the previously determined movement amount not within the permissible value. Note that, for example, a worker previously inputs the permissible value to the control unit 70 via a not shown control panel.

When the control unit 70 judges that the difference of the movement amounts after the die contact among the plurality of pistons 8 is within the permissible value, it ends the processing.

Where the control unit 70 judges that the difference is not within the permissible value, it judges whether or not the number of times of judgment of the difference being out of the permissible value at step S18 has reached a previously determined number of times (n times) (step S19). When it judges that the number of times of judgment has not reached n times, it stands by until a predetermined times T3 passes (step S20), then executes step S18 again.

While the predetermined time T3 passes, the control unit 70 continues to control the direction control valves DCV so as to maintain the pressures detected by the pressure sensors 85 at the previously determined pressure. Accordingly, when the difference of movement amounts among the plurality of pistons 8 is temporary, for example, when the pressures of the clamping cylinders 9 are in transition states converging to the set values while vibrating and the difference of the movement amounts just happens to be out of the permissible value at the time of the judgment at step S18, the difference of movement amounts among the plurality of pistons 8 will eventually become within the permissible value. Note that the number of times n of repetition may be appropriately set.

When the control unit 70 judges that the number of times of judgment being out of the permissible value at step S18 has reached the n-th time, it redoes the clamping. Specifically, it controls the direction control valves DCV so as to boost down the pressures of the cylinder chambers 9a (step S25) and moves the pistons 8 of all clamping cylinders 9 in the die opening direction A1 (retraction) (step S26). Then, when the pistons 8 retracts to where the movable die 6 and the fixed die 5 are separated, it stops the pistons 8 (step S27), then moves them forward in the die closing direction A2 (step S28) to make the dies contact (step S29). Then, it redoes the processing from step S15. Note that it performs steps S25 to S29 while the coupled parts 7a and the half nuts 20 are coupled as they are.

When a difference of movement amounts is occued by accidental factor happening at the time of die contact or the time of clamping boost, by executing step S25 to step S29 and re-doing the clamping, the difference of movement amounts can be eliminated. Note that the counting is re-done from 1 at step S19. Further, when counting the number of times of execution of steps S25 to S29 and the number of times exceeds the predetermined number of times, the control unit 70 may end the processing while alerting the worker of the presence of a persistent factor.

When the processing of FIG. 5 and FIG. 6 ends and the clamping is completed, the molten metal ML is fed into the sleeve 60, and the molten metal ML is injected and filled into the cavity C formed between the clamped fixed die 5 and the movable die 6, whereby the product is molded.

According to the above embodiment, the control unit 70 measures the movement amounts of the plurality of pistons 8 from the die contact to the completion of clamping and controls the direction control valves DCV so that the difference of the movement amounts among the plurality of pistons 8 becomes within the predetermined permissible value, therefore the degradation of the degree of parallelism between a die attachment surface of the fixed die plate 3 and the die attachment surface of the movable die plate 4 during the period from die contact to the completion of clamping is suppressed. Further, the degree of parallelism is maintained by the clamping cylinders 9, therefore, in comparison with the case where a plurality of screw shafts parallel to the tie bars 7 are provided on the periphery of the die plate in order to keep the degree of parallelism, the configuration is simple and, at the same time, the inconvenience of the screw shafts hindering the change of the dies does not occur.

Note that the degree of parallelism in the left/right direction up to the die contact may be adjusted by individually controlling the screw shafts 41 on the left and right. Further, the clamping system 1 of the present embodiment does not perform control for maintaining the degree of parallelism in the up/down direction due to its simple configuration. Accordingly, the fixed die plate 3 and the movable die plate 4 are desirably provided stably with respect to the base 2 so that the inclinations of the die attachment surfaces do not change according to the type of the attached dies.

The clamping system 1 couples the coupled parts 7a and the half nuts 20 during the die closing operation, that is, before die contact, therefore can shorten the molding cycle in comparison with the case of the coupling in the die contact state. Further, it controls the drive mechanism 40 so as to switch the movement speed of the movable die plate 4 to low speed before die contact and starts the movements of the plurality of tie bars 7 in the same direction as the movable die plate 4 (die closing direction A2) simultaneously with the switching to the low speed or after that, therefore smoothly carries out the die closing operation and, at the same time, can shorten the speed difference between the movable die plate 4 and the tie bars 7 while suppressing the reduction of strokes of the tie bars 7 in the clamping operation due to movement of the tie bars 7.

The clamping system 1 controls the movement speeds of the tie bars 7 with reference to the movement speeds of the tie bars 7 as based on the detection results of the position sensors 90 and couples the coupled parts 7a of the tie bars 7 and the half nuts 20 when the difference between the movement speed of the movable die plate 4 and the movement speeds of the tie bars 7 is within the predetermined permissible value. Namely, the position sensors 90 is used for both of the speed detection of the tie bars 7 at the time of the die closing and the detection of the degree of parallelism from the die contact to the completion of clamping, therefore the increase of the number of members is suppressed.

The proximity switches 95 detects the relief shapes of the coupled parts 7a to detect the coupling positions, therefore in comparison with the case where the coupling positions are computed based on the position of the movable die plate 4 detected by the encoders 80 and the positions of the tie bars 7 detected by the position sensors 90, computation of the coupling positions becomes unnecessary, and the coupling positions can be correctly identified.

The present invention is not limited to the above embodiment and may be modified in various ways.

The molding machine to which the clamping system and clamping method of the present invention are applied is not limited to a die cast machine. It includes a metal molding machine, a plastic injection molding machine, a sawdust molding machine, etc. A sawdust molding machine includes for example a machine molding a material comprised of sawdust mixed with a thermoplastic resin.

In the above embodiment, the explanation was given of the case of providing the clamping cylinders 9 at the fixed die plate 3 and providing the half nuts 20 at the movable die plate 4, but it is also possible to employ a configuration providing the clamping cylinders 9 at the movable die plate 4 and providing the half nuts 20 at the fixed die plate 3.

It is sufficient so far as a plurality of tie bars are provided. The number of them is not limited to four. Note that in order to keep the degree of parallelism in the up/down direction and left/right direction, preferably three or more tie bars are provided.

It is sufficient so far as the coupling parts and the coupled parts are coupled with each other and the movements of the tie bars in the axial direction with respect to the fixed die plate or the movable die plate can be restricted. The invention is not limited to the half nuts and grooves provided in the tie bars. For example, holes perpendicularly intersecting the axial direction of the tie bars may be provided in the tie bars and bolts inserted through the holes to fix the tie bars with respect to the die plate.

The coupled parts and the coupling parts may be coupled after the die contact. When the coupled parts and the coupling parts are coupled before the die contact while moving the tie bars, the movements of the tie bars may be started before the switch to the low speed. Note that in this case, the strokes at the time of the clamping become smaller in comparison with the case where the movements of the tie bars are started simultaneously with the switch to the low speed or after that. Further, the permissible value of the speed difference between the movable die plate and the tie bars can be appropriately set. For example, the speed of the movable die plate and the speeds of the tie bars may be made the same. Note that in this case, it is necessary to control the speeds so that the coupled parts and the coupling parts are located at the coupling positions when the speeds become the same.

The detectors detecting physical amounts enabling identification of the movement amounts of the pistons are not limited to the position sensors. For example, the movement amounts may be directly detected. The proximity switches for detecting the coupling positions need not be provided. The positions may be computed from positions of the movable die plate and the tie bars. The working fluid is not limited to oil and may be for example water.

While the invention has been described with reference to specific embodiments, chosen for purpose of illustration, it should be apparent that numerous modifications could be made thereto by those skilled in the art without departing from the basic concept and scope of the invention.

The invention claimed is:

1. A clamping system clamping a fixed die and a movable die, comprising:
   a fixed die plate holding said fixed die;
   a movable die plate holding said movable die and moveable in a die opening direction and die closing direction with respect to said fixed die plate;
   a plurality of tie bars, each having:
      a coupled part including a plurality of grooves arranged alone an axial direction of a tie bar on an outer circumferential surface of said tie bar and coupling with said movable die plate and,
      a piston accommodated in said fixed die plate and generating a clamping force;
   a plurality of coupling parts:
      each coupling part provided in said movable die plate, including a plurality of projection parts, and each coupling part able to couple with or release said coupled part of one of said plurality of tie bars by engaging said plurality of projection parts with any of said plurality of grooves;

a plurality of clamping cylinders, each provided in said fixed die plate and having a cylinder chamber accommodating said piston of one of said plurality of tie bars and at least two working fluid feed ports feeding a working fluid generating said clamping force to said cylinder chamber;

a plurality of position sensors detecting movement amounts of said piston of said one of said plurality of tie bars;

a plurality of directional control valves each connected to said at least two working fluid feed ports and switching a destination of feed of said working fluid between a first cylinder chamber and a second cylinder chamber divided by said piston of one of said plurality of clamping cylinders;

a die open use drive part and a die close use drive part moving said movable die plate in the die opening direction and die closing direction with respect to said fixed die plate;

a plurality of proximity switches fixed with respect to said movable die plate, said plurality, of proximity switches not outputting ON signals when they face said plurality of grooves, and said plurality of proximity switches outputting ON signals when they face a projected rim between said plurality of grooves; and a control part controlling:
  said die open use drive part and said die close use drive part so as to switch a movement speed of said movable die plate to a low speed during a die closing operation,
  said directional control valves so as to start movement of said plurality of tie bars in the die closing direction simultaneously with or after switching to the low speed,
  a movement speed of said plurality of tie bars to be lower than the low speed of said movable die plate with reference to detection results of said plurality of position sensors,
  said plurality of coupling parts to couple with a plurality of coupled parts before die contact by instructing coupling when said plurality of proximity switches output the ON signals when said movable die plate and said plurality of tie bars are moving and the difference between the movement speed of said movable die plate and the movement speed of said plurality of tie bars is within a predetermined permissible value, and
  said plurality of directional control valves based on the detection results of said plurality of position sensors so that a difference of movement amounts of pistons among said plurality of tie bars from the time of die contact to the time of completion of clamping becomes within a predetermined permissible value.

2. A clamping method of a molding machine, comprising:
a clamping mechanism, having:
a fixed die plate holding a fixed die,
a movable die plate holding a movable die and moveable in a die opening and closing direction with respect to said fixed die plate,
a plurality of tie bars each having
  a coupled part including a plurality of grooves arranged alone an axial direction of a tie bar on an outer circumferential surface of said tie bar and coupling with said movable die plate and
  a piston accommodated in said fixed die plate and generating a clamping force,
a plurality of coupling parts:
  each coupling part provided in said movable die plate,
  each coupling part including a plurality of projection parts, and
  each coupling part able to couple with or release said coupled part of one of said plurality of tie bars by engaging said plurality of projection parts with any of said plurality of grooves,
a plurality of clamping cylinders, each clamping cylinder provided in said fixed die plate and having a cylinder chamber accommodating said piston of one of said plurality of tie bars and at least two working fluid feed ports feeding the working fluid generating the clamping force to said cylinder chamber,
a plurality of position sensors detecting movement amounts of pistons of said plurality of tie bars,
a plurality of directional control valves, each directional control valve connected to said at least two working fluid feed ports and switching a destination of feed of said working fluid between a first cylinder chamber and a second cylinder chamber divided by a piston of one of said plurality of clamping cylinders,
a die open use drive part and a die close use drive part moving said movable die plate in the opening direction and the closing direction with respect to said fixed die plate, and
a plurality of proximity switches fixed with respect to said movable die plate, said plurality of proximity switches not outputting ON signals when they face said plurality of grooves, and said plurality of proximity switches outputting ON signals when they face a projected rim between said plurality of grooves,
the clamping method comprising the steps of
  controlling said die open use drive part and said die close use drive part so as to switch a movement speed of said movable die plate to a low speed during a die closing operation;
  controlling said plurality of directional control valves so as to start movement of said plurality of tie bars in the die closing direction simultaneously with or after switching to the low speed;
  controlling movement speeds of said plurality of tie bars to be lower than the low speed of said movable die plate with reference to detection results of said plurality position sensors,
  controlling said plurality of coupling parts to couple with said plurality of coupled parts before die contact by instructing the coupling when said plurality of proximity switches output the ON signals in a state where said movable die plate and said plurality of tie bars are moving and a difference between the movement speed of said movable die plate and the movement speeds of said plurality of tie bars is within a predetermined permissible value,
  measuring movement amounts of the pistons of said plurality of tie bars from a time of die contact and
  adjusting amounts of feed of said working fluid into said plurality of cylinder chambers so that a difference between measured movement amounts among said plurality of tie bars is within a predetermined permissible value at a time of completion of clamping.

* * * * *